Figure 1:
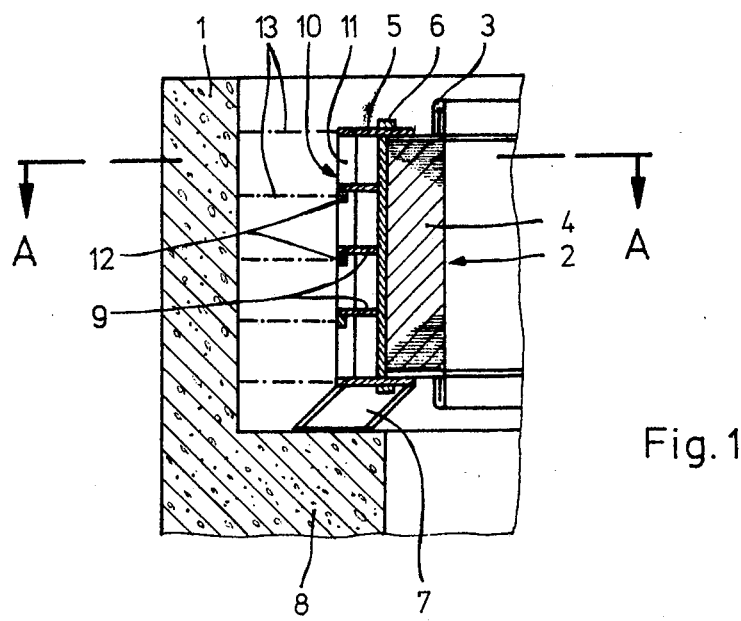

United States Patent [19]

Starčević

[11] 4,060,744

[45] Nov. 29, 1977

[54] ROTARY ELECTRICAL MACHINE OR VERTICAL CONSTRUCTION

[75] Inventor: Mihailo Starčević, Mellingen, Switzerland

[73] Assignee: BBC Brown Boveri & Company Limited, Baden, Switzerland

[21] Appl. No.: 630,758

[22] Filed: Nov. 11, 1975

[30] Foreign Application Priority Data

Nov. 19, 1974 Switzerland ............... 15351/74

[51] Int. Cl.² ............................................. H02K 5/00
[52] U.S. Cl. .................................... 310/91; 310/157; 310/258
[58] Field of Search ............... 310/89, 91, 157, 250, 310/258, 259

[56] References Cited

U.S. PATENT DOCUMENTS

| 2,754,441 | 7/1956 | Morgan | 310/258 |
|---|---|---|---|
| 3,293,464 | 12/1966 | Spirk | 310/157 X |
| 3,387,152 | 6/1968 | Mücke | 310/157 X |
| 3,742,271 | 6/1973 | Whitney | 310/91 X |

Primary Examiner—Donovan F. Duggan

Attorney, Agent, or Firm—Pierce, Scheffler & Parker

[57] ABSTRACT

A support structure for the stator component of an electrical machine having a larger diameter, the rotor of which rotates about a vertical axis. The stator and foundation on which the stator rests form concentric inner and outer rings respectively joined by means of spoke-like arms spaced uniformly around the circumference, and the arrangement of these arms is such that they are tangent to the surface of an imagined coaxial cylinder the diameter of which is smaller than that of the inner ring, and the axes of two neighboring arms when imagined as extended in a straight line over both rings intersect only within the inner ring. The respective axes of the arms form identical acute angles with radial lines extending respectively from the common center of the inner and outer rings through corresponding joints which interconnect the outer ends of the arms with the outer ring and all of the arms are inclined in the same sense so as to accommodate torsional stresses imposed upon the inner ring caused by thermally induced expansion of that ring. The arms are inflexible over their whole effective length in the longitudinal direction corresponding to the applied load.

5 Claims, 6 Drawing Figures

ROTARY ELECTRICAL MACHINE OR VERTICAL CONSTRUCTION

The invention concerns an electrical machine of vertical construction, the stator and foundation of which form two concentric rings joined by means of spoke-like arms spaced evenly around the circumference.

When machines of this kind, in particular slow-running hydro generators, are in operation, very considerable tangential and radial forces occur which must be absorbed by the foundation or by the machine housing connected to it. Forces of this kind are caused, for example, by heating, torque or magnetic pull when the machine is running.

Electrical machines of this construction are today built in sizes of up to 600 MW and thus have outside diameters of up to 20 m. The air gap between rotor and stator is in all cases 1/1000 of the greatest diameter, which gives a clear indication of the problem. The magnetic pull, for example, tends to compress the stator radially into an elliptical shape. To preserve the air gap, therefore, the stator must be held in a rigid frame, which raises further difficulties as regards coping with the thermal expansion forces. A rigid means of supporting the stator can restrict its radial expansion to such an extent that the laminations buckle when thermally stressed.

In a known solution to this problem (U.S. Pat. No. 3,742,271 Whitney) it is proposed that the stator should be allowed limited movement. The stator is surrounded by a number of supports, each of which has a vertical and a radial member. The vertical member is anchored in the foundation, while the radial member is supported in the concrete ring. The stator is supported on the vertical member via resilient radial and tangential elements.

A further known construction (Swiss Pat. No. 440,435 Mucke) mentions the possibility of mounting truss-like braces between stator laminations and concrete housing, the junction points of these braces on the housing side being anchored in the concrete ring by means of adjusting bolts. Owing to thermal expansion forces applied to the stator, compressive stresses can occur in the braces, and so forces directed radially outwards are exerted on the adjusting bolts. In the concrete these forces give rise to tangential tensile stresses, which are harmful to the concrete, so that when the machine is in operation the concrete ring is stressed only in compression, and the stator laminations only in tension, it is proposed that the concrete ring should be pre-stressed by, though not joined to, the tensioned bracing rods uniformly spaced around the circumference of the stator laminations and joined to the base of the laminations, and held at a distance from the laminations by the bracing rods. Disadvantages of this construction are the absolutely necessary pre-stress, which can be attained only by hydraulic means, and the large space required for the braces; it is scarcely possible to mount coolers, and in addition, access for purposes of inspection and maintenance is difficult. When the stator becomes heated, the tensile pre-stress in the braces and laminations decreases; to prevent the complete disappearance of the pre-stress at the operating temperature, and possibly the occurrence of a compressive stress, the braces are compensated with great radial resilience, whereupon it becomes difficult to maintain the air gap between rotor and stator.

Other solutions are known in which, however, as with those described above, relative expansion of the components is made possible either by radial flexibility or by allowing the arms to move radially. With large machines especially, for which the ring-shaped components are designed to be highly resilient, the problems shift to the stiffness of the rings and concentricity, and this leads to very expensive solutions.

The object of the invention is to devise a rigid construction which can transmit axial, radial tangential forces, allows concentric expansion of the ring in the event of both symmetrical and asymmetrical loads, and is subject to only small expansion forces.

This object is achieved in that the arms are tangents to the surface of an imagined coaxial cylinder the diameter of which is smaller than that of the inner ring, that the axes of two neighbouring arms when imagined as extended in a straight line over both rings intersect only within the inner ring, and that the arms are inflexible over their whole effective length in the longitudinal direction corresponding to the applied load. Moreover, the respective axes of the arms form identical acute angles with radial lines extending respectively from the common center of the inner and outer rings through corresponding joints which interconnect the outer ends of the arms with the outer ring and all of the arms are inclined in the same sense so as to accommodate torsional stresses imposed upon the inner ring caused by thermally induced expansion of that ring.

The advantage of the invention lies particularly in the fact that all components are completely free to expand concentrically without the use of resilient radial elements, such as springs for example. This allows simpler and less expensive constructions.

If the arms are fixed to at least one of the rings by means of hinged joints, the thermal expansion forces exerted on the rings by the arms are almost completely eliminated, and so the rings can be of lighter construction. In addition, a hinged form of attachment has important advantages over a rigid fixing as regards assembling and dismantling the components.

Particularly effective is an arrangement whereby the arms are adjustable in length. In this way, initial eccentricities can be reduced to a minimum during erection, which is of great benefit as regards adjustment of the air gap between rotor and stator.

It is of advantage if the anchoring points of at least one of the rings are joined with tie bars for purpose of stiffening. If these bars are adjustable in length, any desired pre-stress can easily be exerted on the rings. This construction, which thus behaves as a truss, is extremely stiff and light.

Figure 2:
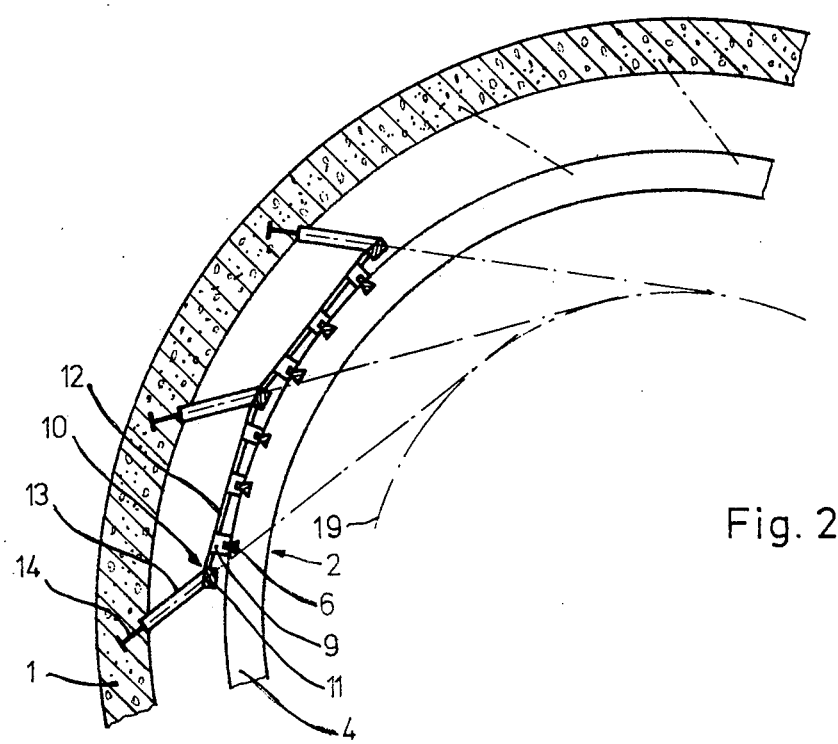
Figure 3:
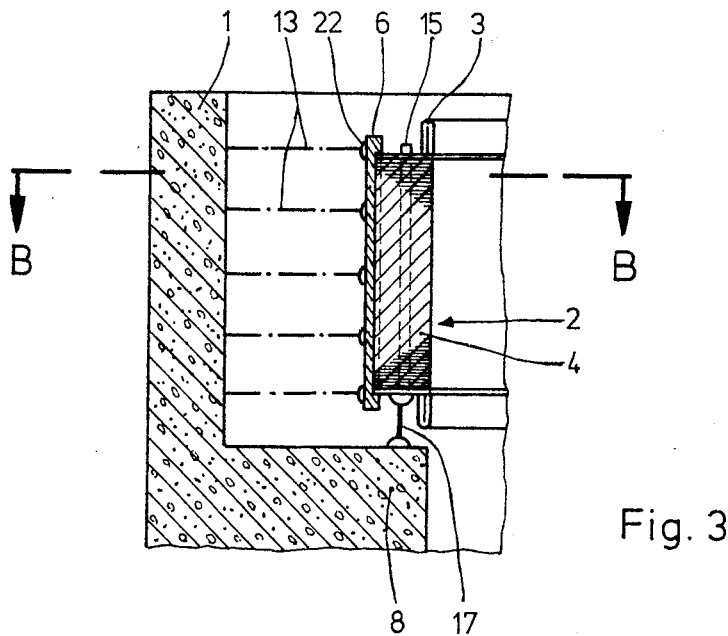
Figure 4:
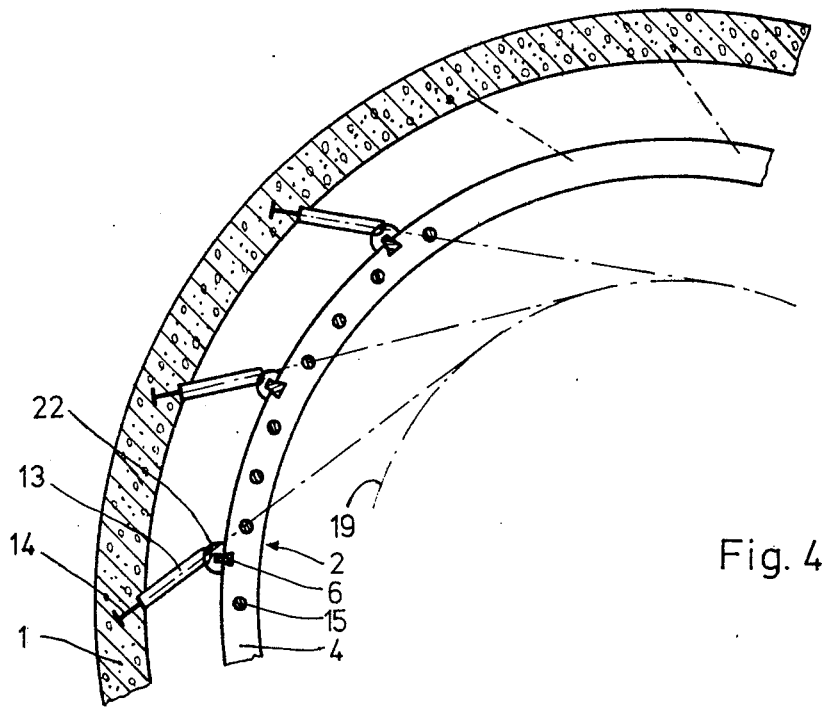
Figure 5:
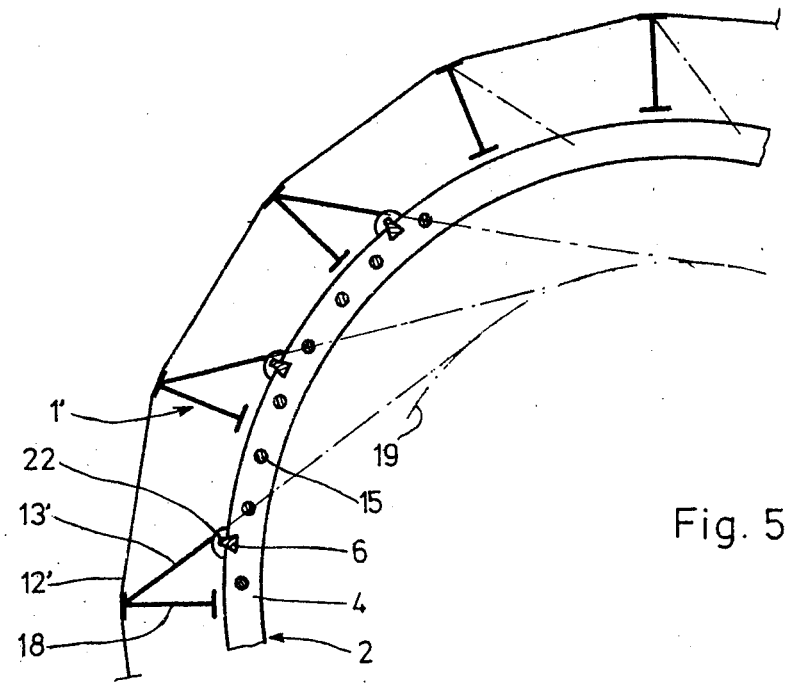
Figure 6:
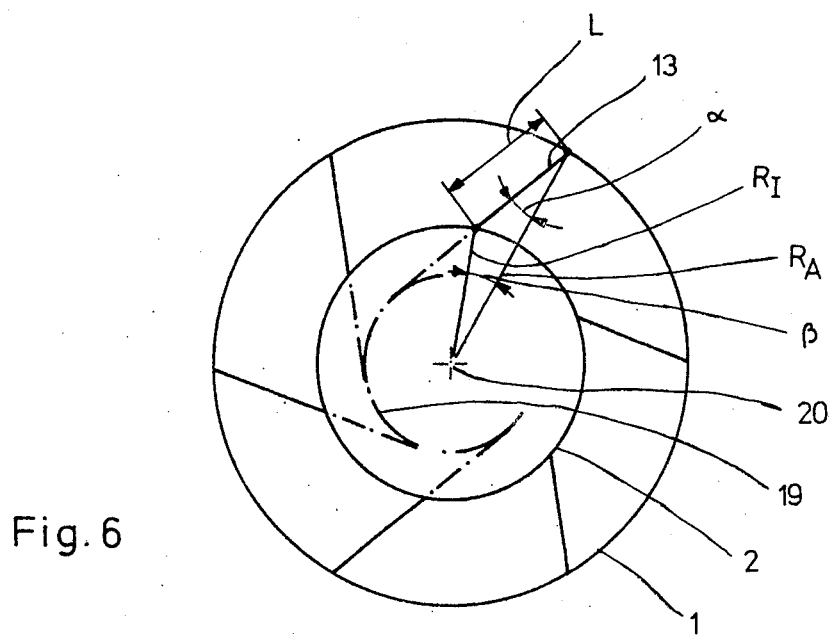

The invention is explained in the following by means of examples with reference to the drawings, in which:

FIG. 1 shows part of an axial section through an electrical machine of vertical construction and through its surrounding concrete ring, FIG. 2 is a partial section of the arrangement shown in FIG. 1 along the line A—A, FIG. 3 is a partial section as in FIG. 1, but with a stator of different construction, FIG. 4 is a partial section of the arrangement shown in FIG. 3 along the line B—B, FIG. 5 is a partial section of an arrangement such as in FIG. 3, but with a frame of different construction, and FIG. 6 is a schematic representation of the machine support to illustrate the principle of the invention.

In the example in FIGS. 1 and 2 the concentric outer ring 1 consists usually of the generator pit, built as a concrete ring. The stator forms the concentric inner ring 2 and comprises essentially a stator winding 3, stator laminations 4 pressed together axially by pressure plates 5, and wedges 6 of dovetail cross-section which serve to locate and secure the lamination segments. The stator rests by way of a supporting structure 7 on the foundation 8, which also carries the concrete ring. Straps 9 are fixed at various heights to wedges 6 and rest on a frame 10. This consists of vertical columns 11 joined together by beams which are adjustable in length and in the terms of the invention constitute the tie bars 12. The stator is joined to the concrete ring by spoke-like arms 13, of which sixteen arms are uniformly spaced around the circumference at each of several different heights. They form tangents to the surface of an imagined coaxial cylinder 19, the diameter of which is smaller than the outside diameter of frame 10. The arms 13 are anchored by means of a bolted joint (not shown) to columns 11 and to vertical beams 14 cast in the concrete ring. In the longitudinal direction, arms 13 are to be considered as rigid over the whole load-bearing length, and as inflexible with respect to the load. It is also not shown that the arms 13 are adjustable in length, by means of shims for example. In this way it is possible to centre the stator accurately and adjust its circular shape. If necessary, a tensile pre-stress is applied to the laminations 4 by way of the beams of the frame 10. This pre-stress is essentially superfluous as heating of the stator, at least, causes no pressure to be exerted on the laminations 4 because these can expand freely.

Nevertheless, a tensile pre-stress to a lesser extent is to be recommended; the magnetic forces uniformly distributed around the circumference and directed radially inwards induce in the laminations 4 a tangential tensile stress which can be greatly reduced, or even completely eliminated, by pre-stressing.

FIGS. 3 and 4 show another example of the invention. Parts corresponding to those in FIGS. 1 and 2 are denoted by the same reference symbols.

The laminations 4 of stator 2 are compressed axially by means of tie bolts 15 which are insulated and fit neatly through holes in laminations 4. A frame surrounding the laminations 4, as in FIG. 1, can be omitted with this arrangement because the tie bolts 15 and the dovetail wedges 6 on the outside join the laminations into a compact ring. The mechanical properties of the laminations are further improved by bonding the segments. The arms 13 are fixed at one end to the concrete ring as in FIG. 1, and at the other directly to the wedges 6 of the stator 2. In the example shown they are anchored in hinged joints 22. The laminations 4 are completely free to expand, thus eliminating cross-braces for pre-stressing and stiffening. Consequently, the vertical load is transmitted via columns 18 to the foundation 8. These columns provide no kind of guidance and are intended only to eliminate the friction which would otherwise occur if the stator rested immediately on the foundation.

A particularly favourable example of the invention is shown in FIG. 5. Parts identical to those in FIGS. 1 to 4 are provided with the same reference symbols and are not described further. Components not essential to the invention are omitted from the schematic diagram. This is a free-standing machine which has no concrete ring. The stator frame constitutes the ring 1' and consists of radially arranged vertical columns 18 anchored at their bottom end in the concrete foundation (not shown) and joined at their upper end to the arms of a bearing spider (not shown). The stator construction and the anchorage points of arms 13' at the stator end are the same as those in FIGS. 3 and 4. The arms 13' are mounted at several different heights as in FIG. 4 and welded to the radially outer part of columns 18. The columns can be sectional beams, frame girders or a composite steel/concrete structure. Compared with known solutions, and also those of FIGS. 1 to 4, the radial width of columns 18 can be greatly increased by utilizing all the available space; in the present case by a factor of three, giving roughly nine times the bending strength for approximately the same column weight. With constructions of this kind there is no need for the otherwise customary lightweight steel machine housing, which is replaced by a steel enclosure mounted direct on the columns 18, affording the necessary stiffness and in the present example forming the bars 12'.

The principle of the invention can be described with reference to the diagram of FIG. 6. The two concentric rings and the arms are identified by the same reference symbols as the corresponding parts in FIGS. 1 to 5. The arms 13 are tangents to the chain-dotted cylinder 19. Starting from the centre 20 of the system, $R_I$ is the radius of ring 2, $R_A$ that of ring 1, and the two radii form the angle $\beta$. $\alpha$ denotes the angle contained between $R_A$ and the considered arm 13, which has a length of L. For simplicity the angle $\gamma$ is introduced; this is the arithmetic sum of $\alpha$ and $\beta$.

Let one first consider symmetrical expansion $\Delta L$ of arms 13, due to heat for example. This elongation is converted into a relative rotation of the two rings 1, 2, which is most conveniently expressed as a change in angle $\beta$.

$$\Delta \beta = (\Delta L / (R_I \cdot \sin \gamma)$$

According to the object of the invention, expansion of the rings is required to be free and concentric under all load conditions. The following generally valid relationship can be written for both separate and combined changes of L, $R_I$ and $R_A$:

$$\Delta \beta = \Delta L/(R_I \cdot \sin \gamma) + \Delta R_I/((R_I \cdot \tan \gamma) - (R_A \cdot \cos \alpha)/(R_I \cdot \sin \gamma)$$

This relationship is valid when the fixings at both ends of the arms 13 are hinged.

The forces acting at right angles to the machine axis are resolved into components which act in the direction of the axes of the arms. As with a frame structure, the arms are stressed only in tension or compression and consequently the assembly has great stiffness.

When the assembly is loaded symmetrically, expansion or contraction of the ring-shaped parts takes place concentrically. With asymmetrical loading, for example heating of the arms 13 on one side, the centre of the assembly could move eccentrically. This can be remedied by various means of adaptation, for instance by dimensioning the cross-sections in accordance with the forces which occur, by a suitable choice of materials, or in the case of individual arms 13 by altering the angles $\alpha$ and $\beta$ with appropriate modification of length L.

If the anchorage points on one of the two rings, in FIG. 4 on the stator for example, are provided with hinged joints 15, which by their nature do not transmit bending forces, none of the forces caused by the arms 13 are transferred to the rings 1, 2.

If the arms are rigidly fixed to the anchorage points they undergo slight bending owing to the relative rotation of the rings. The change of angle $\Delta\beta$ is somewhat smaller than with a hinged arrangement. Since the arms are preferably of shaped profile with a relatively high moment of inertia, owing to the risk of buckling, the ends can be solid, but must have a moment of inertia as small as possible about the bending axis. In this way, bending can be localized to the ends of the arms. A particularly easy way of making these ends easily bendable is to use hollow sections for the arms. Over their effective load-bearing length these have a cross-section with a relatively high moment of inertia; at the anchorage points the cross-section is pressed to a flat shape. The load-bearing cross-section then remains the same, while the moment of inertia about the bending axis is sharply reduced.

As is also apparent from FIG. 6, the respective axes of the arms 13 form identical acute angles $\alpha$ with radial lines extending respectively from the common center of the stator ring 2 and the outer ring 1 through corresponding joints which interconnect the outer ends of these arms with the outer ring 1. Moreover, all of the arms are inclined in the same sense so as to accommodate torsional stresses imposed upon the stator ring 2 caused by thermally induced expansion thereof.

The invention is of course not restricted to what is shown in the drawings. This, in the example of the free-standing machine, a stator construction such as shown in FIG. 1 could of course also be used. Similarly, the radial width of columns 18 could be reduced, and the arms 13' joined to the radially inward part of the columns. Also, as an alternative to the arrangements of FIGS. 1 to 4, the arms could be fixed to the outer edge of the concrete ring.

With all the constructions shown, the fact that relative expansion of the various components is converted into relative rotation of the ring-shaped parts ensures completely free, concentric expansion of the latter and, a point of interest particularly to the foundation maker, forces on the foundation due to thermal expansion are completely eliminated.

Through a suitable choice of the dimensions and of angle $\alpha$ of the arms, the natural torsional frequency of the stator can be made lower than the power system frequency, thus effectively reducing the torque exerted on the foundation in the event of a dead short circuit.

The rings of the invention can be of polygonal or circular form, provided the anchorage points of each ring lie on a circle.

I claim:

1. An electrical machine of vertical construction, the stator and surrounding foundation of which form concentric radially spaced inner and outer rings respectively, a system of circumferentially extending and uniformly distributed spoke-like arms located intermediate said inner and outer rings, and means joining the opposite ends of said arms to said inner and outer rings, the respective axes of said arms forming identical acute angles with radial lines extending respectively from the common center of said inner and outer rings through corresponding joints which interconnect the outer ends of said arms with said outer ring, and said arms being inflexible over their whole effective length in the longitudinal direction corresponding to the applied load, all of said arms being inclined in the same sense so as to accommodate torsional stresses imposed upon said inner ring caused by thermally induced expansion thereof.

2. An electrical machine as claimed in claim 1, in which the arms are fixed to at least one of the rings by means of hinged joints.

3. An electrical machine as claimed in claim 1, in which the arms are adjustable in length.

4. An electrical machine as claimed in claim 1, in which the anchorage points of the arms of at least one of the rings are joined by tie bars.

5. An electrical machine as claimed in claim 4, in which the tie bars are adjustable in length.

* * * * *